Sept. 29, 1925.
E. G. PARVIN
1,555,071
MOTOR REVERSING MEANS
Filed March 31, 1925
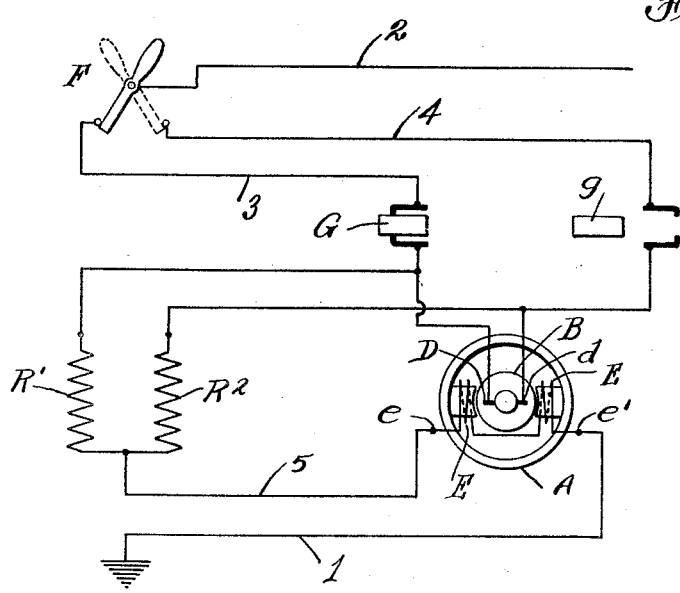
INVENTOR
Edward G. Parvin
BY
John E. Drebbell
ATTORNEY Patented Sept. 29, 1925.

1,555,071

UNITED STATES PATENT OFFICE.

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK.

MOTOR-REVERSING MEANS.

Application filed March 31, 1925. Serial No. 19,573.

*To all whom it may concern:*

Be it known that I, EDWARD G. PARVIN, a citizen of the United States, and resident of Roselle, in the county of Union and State of New Jersey, have invented certain new and useful Improvements in Motor-Reversing Means, of which the following is a specification.

The general object of my present invention is to provide improved means for causing a reversible electric motor to operate in either direction as desired. More specifically, the object of my invention is to provide simple and effective provisions for energizing a reversing commutating motor from a source of potential difference great enough to make it advantageous or at least not seriously objectionable to employ resistance of appreciable magnitude in series with the armature winding of the motor.

The various features of novelty which characterize my invention are pointed out with particularity in the claims annexed to and forming a part of this specification; but for a better understanding of the invention, its advantages and specific objects attained with its use, reference should be had to the accompanying drawings and descriptive matter in which I have diagrammatically illustrated and described preferred embodiments of my invention.

Of the drawings:

Fig. 1 is a diagram illustrating suitable connections for energizing a car door operating motor from the power or trolley circuit of an electric railway; and Fig. 2 is a diagram illustrating a modification of the arrangement shown in Fig. 1.

In the drawing, and referring first to Fig. 1, A represents the field magnet, B the armature, D and $d$ the brushes of opposing polarity, and E the field coils of an ordinary direct current motor. The brush $d$ is connected to one side of the power circuit, as shown, by a ground connection 1, while the other brush D may be connected to the other side of the power circuit shown as a trolley wire or other conductor 2 in either of two ways depending on the setting of a switch F. With the setting of the switch F shown in full lines in the drawing, the brush D is connected to the conductor 2 through a conductor 5, resistance $R'$, a shunt about the resistance $R'$ which includes a resistance $R^2$ and the motor field coils E, and a conductor 3. By throwing the switch F into the dotted line position shown in the drawing, the brush D may be connected to the conductor 2 through conductor 5, the resistance $R^2$, a shunt about the resistance $R^2$ which includes the resistance $R'$ and motor field coils E, and a conductor 4.

With the described arrangement the adjustment of the switch F from one to the other of its two operative positions does not change the direction of current flow through the armature winding of the motor, but does change the direction of current flow through the field coils E. In consequence, if the motor will turn in the clockwise direction, for example, with the switch F in its full line position, it will turn in the counter-clockwise direction with the switch F in its dotted line position. Furthermore, if the resistance $R'$ and $R^2$ are of equal magnitude, the strength of the energizing currents through the field winding and armature of the motor will be the same for similar load conditions in either setting of the switch F.

The described arrangement is well adapted for such a purpose as that for which it was primarily designed, namely, for opening and closing the car doors of electric railway trains, because of its simplicity and reliability, and because in such a use the voltage impressed on the armature winding is advantageously but a fraction of the voltage of the power circuit, so that resistance in series with the armature winding is necessary or desirable in any event.

In operating car doors and for other purposes for which the invention may be employed with special advantage, limit switches G and $g$ which may be of any usual or suitable type are advantageously provided each to be actuated by the motor to open the motor energizing circuit of which it forms a part when the motor movement in the corresponding direction has reached a predetermined limit. With the described arrangement in which the switches G and $g$ are located in the conductors 3 and 4, respectively, the circuit including the field coils E and resistances $R'$ and $R^2$ in series with one another, tends to reduce sparking at either of the limit switches G and $g$ when it is opened to arrest the movement of the motor. While I have illustrated the use of my invention in connection with a two pole, two brush motor it will be apparent that the invention is in no wise restricted or dependent upon such characteristics of the motor employed.

In the arrangement shown in Fig. 1, the brush D is connected to one terminal e of the field winding E through the resistance R', and is connected to the other terminal e' of the field winding through the resistance R², and the field winding terminals e and e' are connected through conductors 3 and 4, respectively, to contacts of the switch mechanism F. By reversing the connections to the two pairs of elements formed by the brushes D and d, and the field winding terminals e and e', the arrangement of Fig. 2 is obtained. With the arrangement shown in Fig. 2, the direction of armature rotation may be reversed by means of the switch F, as with the arrangement shown in Fig. 1. The arrangement of Fig. 2 possesses a specific advantage over that shown in Fig. 1, in that whichever of the two resistances R' and R² is in shunt with the armature B, exerts a sort of dynamic braking or armature speed limiting effect. Thus with the setting of the switch F illustrated in Fig. 2, the maximum possible speed of the motor armature is obviously that in which the counter E. M. F. of the motor armature is equal to the voltage drop through the resistance R', and when the switch F is shifted to its other operative position, the maximum possible motor armature speed is also that in which the counter E. M. F. of the motor armature equals the voltage drop through the resistance R². This makes it possible to omit speed limiting short circuiting windings on the armature B in some cases in which such windings would be required with the arrangement shown in Fig. 1. The arrangement shown in Fig. 2 is open to the disadvantage, however, that when used in such a circuit as a railway trolley circuit, the armature is connected to the trolley side of the circuit, so that accidental grounding of the motor armature might have injurious consequences which would not be produced by a ground to the motor armature in Fig. 1.

The arrangement shown in Fig. 1, and generically claimed herein, is specifically claimed in my application, Serial No. 745,004, filed October 21, 1924, of which this application is a continuation in part.

Having now described my invention, what I claim as new and desire to secure by Letters Patent, is:

1. A commutating motor comprising a pair of commutator brush elements and a pair of field winding terminal elements, and in combination therewith means for connecting one of said elements to one side of an energizing source of current, two resistances each connected to the second element of the pair including the previously mentioned element, and one of said resistances connecting said second element to one, and the other resistance connecting said second element to the second of the other two elements, and means for optionally connecting either of the last mentioned pair of elements to the other side of said source.

2. The combination with the commutator brushes and field winding of a commutator motor, of a resistance connecting one of said brushes to one terminal of the field winding, a second resistance connecting the other brush to said field winding terminal, and means for connecting the other field winding terminal to one side of an energizing source of current and for optionally connecting one or the other of said brushes to the other side of said source.

3. The combination with the brushes and field winding of a commutator motor, of means for energizing the motor for rotation in either direction comprising a pair of conductors connected to said brushes, a pair of resistances connected between said conductors in series with one another and in multiple with said brushes, a connection from one terminal of said field winding to the connection between said resistances, means for connecting the other terminal of said field winding to one side of an energizing source of current and for optionally connecting one or the other of said conductors to the other side of said source, and a limit switch in each of said conductors and each adapted on a predetermined movement of the motor to open the corresponding conductor at a po    between its connection to the source of current and its connection to the corresponding resistance and brush.

4. A reversible electric motor comprising an armature winding and its two terminal elements and a field winding and its two terminal elements, and in combination therewith means for connecting one of the two terminal elements of one of said windings to one side of an energizing source of current, two resistances each connected to the second terminal element of the last mentioned winding, and one of said resistances connecting said second terminal element to one, and the other resistance connecting said second element to the second of the two terminal elements of the other winding, and means for optionally connecting either of the last mentioned pair of terminal elements to the other side of said source.

Signed at Garwood, in the county of Union, and State of New Jersey, this 28th day of March, A. D. 1925.

EDWARD G. PARVIN.